US009363032B2

(12) United States Patent
Renaudier et al.

(10) Patent No.: US 9,363,032 B2
(45) Date of Patent: Jun. 7, 2016

(54) FLEXIBLE OPTIMIZATION OF THE SIGNAL-TO-NOISE RATIO FOR ULTRA DENSE COHERENT WDM SYSTEMS

(71) Applicant: Alcatel Lucent, Boulogne Billancourt (FR)

(72) Inventors: Jeremie Renaudier, Nozay (FR); Oriol Bertran-Pardo, Nozay (FR)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 14/380,252

(22) PCT Filed: Mar. 21, 2013

(86) PCT No.: PCT/EP2013/055992
§ 371 (c)(1),
(2) Date: Aug. 21, 2014

(87) PCT Pub. No.: WO2013/143976
PCT Pub. Date: Oct. 3, 2013

(65) Prior Publication Data
US 2015/0037034 A1    Feb. 5, 2015

(30) Foreign Application Priority Data

Mar. 29, 2012    (EP) .................................... 12305365

(51) Int. Cl.
*H04J 14/06*    (2006.01)
*H04J 14/02*    (2006.01)
(Continued)

(52) U.S. Cl.
CPC ............ *H04J 14/02* (2013.01); *H04B 10/0799* (2013.01); *H04B 10/508* (2013.01);
(Continued)

(58) Field of Classification Search
CPC ........ H04J 14/02; H04J 14/06; H04B 10/508; H04B 10/67
See application file for complete search history.

(56) References Cited

U.S. PATENT DOCUMENTS 6,157,475 A    12/2000    Dugan et al.
2001/0038475 A1    11/2001    Wolf
(Continued)

FOREIGN PATENT DOCUMENTS

CN    1729636    2/2006
JP    2009188788    8/2009
(Continued)

OTHER PUBLICATIONS

Sano, A. et al; Ultra-High Capacity WDM Transmission Using Spectrally-Efficient PDM 16-QAM Modulation and C- and Extended L-Band Wideband Optical Amplification; Journal of Lightwave Technology, IEEE Service Center, New York, NY, US, vol. 29, No. 4; Feb. 1, 2011; pp. 578-586; XP011345959; ISSN: 0733-8724; DOI: 10.1109/JLT.2011.2107030.

(Continued)

*Primary Examiner* — Dzung Tran
(74) *Attorney, Agent, or Firm* — Patti & Malvone Law Group, LLC

(57) ABSTRACT

The present document relates to optical communication systems. In particular, the present document relates to high efficiency wavelength division multiplexing (WDM) optical communication systems. An optical transmitter (210) adapted to transmit an optical signal on an optical wavelength division multiplexed, referred to as WDM, transmission channel (111) to a corresponding optical receiver (230) is described. The optical transmitter (210) comprises a profiling unit (217) adapted to receive information regarding an equalization filter (270) adapted at the corresponding optical receiver (230), based on a first optical signal received from the optical transmitter (210); a pulse shaping filter unit (212) adapted to filter a sequence of data symbols (211) using a pulse shaping filter, thereby yielding a filtered sequence of data symbols (211); wherein a frequency response (404, 405) of the pulse shaping filter depends on the information regarding the equalization filter (270); and a digital-to-optical converter (214, 215 216) adapted to convert the filtered sequence of data symbols (211) into a second optical signal to be transmitted to the optical receiver (230).

13 Claims, 4 Drawing Sheets

(51) Int. Cl.
*H04L 1/00* (2006.01)
*H04L 25/02* (2006.01)
*H04B 10/079* (2013.01)
*H04B 10/61* (2013.01)
*H04B 10/508* (2013.01)
*H04B 10/67* (2013.01)

(52) U.S. Cl.
CPC .......... *H04B10/6166* (2013.01); *H04B 10/67* (2013.01); *H04J 14/06* (2013.01); *H04L 1/0035* (2013.01); *H04L 25/0288* (2013.01); *H04J 14/026* (2013.01); *H04J 14/0258* (2013.01); *H04J 14/0273* (2013.01); *H04J 14/0275* (2013.01)

(56) References Cited

U.S. PATENT DOCUMENTS

| | | | | |
|---|---|---|---|---|
| 2004/0197103 | A1* | 10/2004 | Roberts | H04B 10/2543 398/159 |
| 2004/0208613 | A1 | 10/2004 | Sinha et al. | |
| 2011/0176815 | A1* | 7/2011 | Frankel | H04B 10/5053 398/184 |
| 2012/0082466 | A1* | 4/2012 | Wu | H04B 10/2575 398/183 |
| 2012/0134676 | A1* | 5/2012 | Kikuchi | H04B 10/532 398/65 |
| 2012/0251119 | A1* | 10/2012 | McNicol | H04J 14/02 398/91 |

FOREIGN PATENT DOCUMENTS

| | | |
|---|---|---|
| JP | 2009239555 | 10/2009 |
| WO | 2011030897 | 3/2011 |

OTHER PUBLICATIONS

Jiang, Y. et al; Electronic Pre-Compensation of Narrow Optical Filtering for OOK, DPSK and DQPSK Modulation Formats; Journal of Lightwave Technology, Aug. 15, 2009, vol. 27 No. 16, pp. 3689-3698.

Fujimori, T. et al; A Study of compensation for 43Gbps spectrum narrowing using pre-equalization; IEICE Technical Report, Optical Communication System, Japan, the Institute of Electronics, Information and Communication Engineers, Oct. 21, 2010, vol. 110, No. 257, pp. 97-102.

* cited by examiner

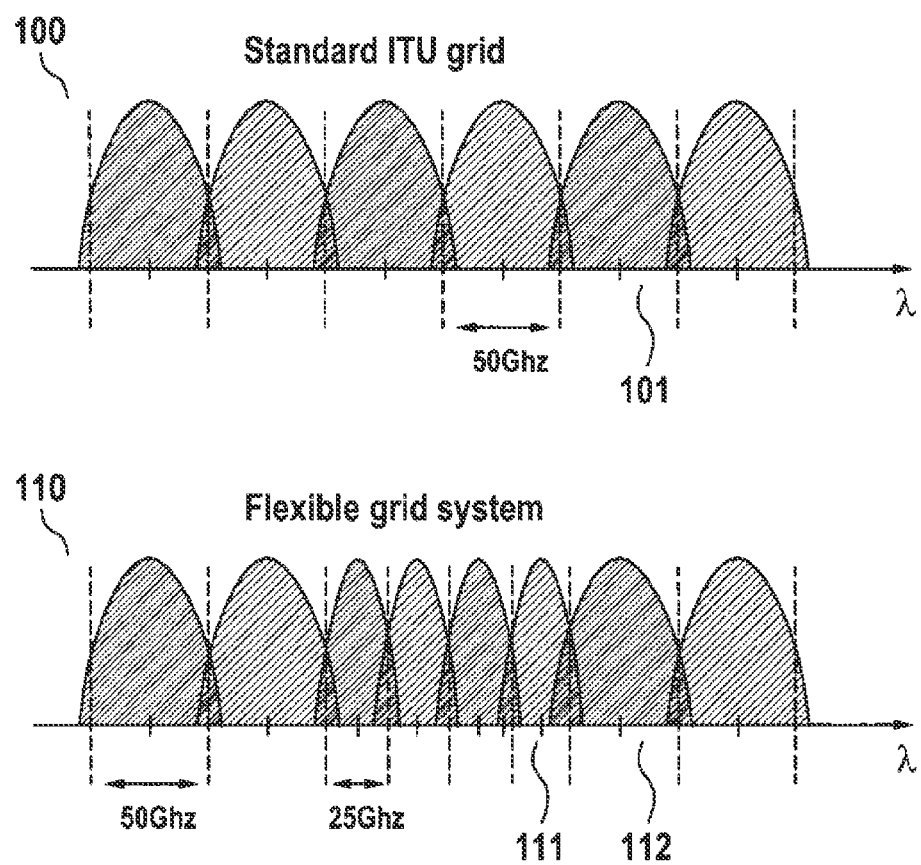

FLEXIBLE OPTIMIZATION OF THE SIGNAL-TO-NOISE RATIO FOR ULTRA DENSE COHERENT WDM SYSTEMS

The present document relates to optical communication systems. In particular, the present document relates to high efficiency wavelength division multiplexing (WDM) optical communication systems.

High spectral efficiency optical communication systems are interesting in order to cope with the foreseen demand for capacity increase in optical communication networks. In this context, multi-level modulation formats (e.g. quadrature phase shift keying, QPSK) combined with polarization multiplexing (PDM), as well as digital coherent detection techniques are being investigated. Polarization division multiplexed quadrature phase shift keying (PDM-QPSK) paired with coherent detection may be used to achieve a transmission rate of 112 Gb/s (typically referred to as 100 Gb/s). This format yields a spectral efficiency of 2 b/s/Hz in a standard WDM transmission system based on a 50 GHz grid between two adjacent WDM channels (as shown in the WDM channel diagram 100 of FIG. 1, where all WDM channels 101 have the same channel width). One possible approach to increase the spectral efficiency of such 100 Gb/s systems is to use higher level modulation formats like PDM-8 QAM, PDM-16 QAM, etc. However, such formats typically have a lower sensitivity to optical noise and a weaker tolerance to nonlinear effects, and therefore may result in a reduction of the transmission reach compared to PDM-QPSK.

Another approach to further increase the spectral efficiency of 100 Gb/s optical transmission systems is to tightly pack WDM channels, i.e. to reduce the channel spacing between adjacent WDM channels. Transmission with 3 b/s/Hz or 4 b/s/Hz spectral efficiency may be achieved using 100 Gb/s PDM-QPSK channels over a 33 GHz and a 25 GHz grid, respectively (instead of a conventional 50 GHz grid).

Flexible grid WDM systems may be used in order to optimize bandwidth occupancy depending on an (optimum) trade-off between transmitted capacity and transmission reach. By way of example, a semi-flexible system architecture may be used having a granularity of 12.5 GHz (starting from the ITU grid) in order to define channel slots of different width, instead of having a fixed 50 GHz grid. This enables to vary the channel packing in a pre-determined range depending on the (optimum) trade-off between optical path impairments and required capacity. This is shown in the WDM channel diagram 110 of FIG. 1, where different WDM channels 111, 123 have different channel widths.

WDM systems working with reduced channel spacing appear to be an efficient method to increase system capacity with only a limited reduction of the transmission reach. However, the optimization of the signal-to-noise-ratio (SNR) at the optical receiver of a transmission channel is challenging in flexible grid systems as the different filtering functions used for the WDM channels 111, 112 of different width (e.g. 50 GHz, 37.5 GHz, 25 GHz, etc.) distort the optical signal in a different manner. The present document addresses the above mentioned technical problem. In particular, the present document describes methods for selecting appropriate optical filters at the transmitter of an optical transmission system, in order to increase the SNR at a corresponding optical receiver of the optical transmission system.

According to an aspect an optical transmitter is described. The optical transmitter is adapted to transmit an optical signal on an optical wavelength division multiplexed (WDM) transmission channel to a corresponding optical receiver. The WDM transmission channel may have a pre-determined bandwidth which may depend on a pre-determined grid of WDM channels. The bandwidth may be adjustable in accordance to the grid of WDM channels. By way of example, the bandwidth may be adjustable on a grid granularity of 12.5 GHz. The optical transmitter may be adapted to adjust to the bandwidth of the WDM transmission channel.

The optical transmitter comprises a profiling unit adapted to receive information regarding an equalization filter, wherein the equalization filter has been adapted or adjusted at the corresponding optical receiver. The equalization filter may be used by the corresponding optical receiver to compensate for distortions incurred by a first optical signal transmitted from the optical transmitter over the WDM transmission channel to the optical receiver. The first optical signal is typically representative of a first sequence of data symbols. In particular, the first optical signal may have been obtained by modulating an optical carrier signals with a sequence of symbols derived from the first sequence of data symbols. In this context, the equalization filter may be used by the corresponding optical receiver to compensate for pulse shaping filtering performed at the optical transmitter. Such pulse shaping filtering may be performed at the optical transmitter in order to adjust the first sequence of data symbols and consequently the first optical signal to the bandwidth of the WDM transmission channel. As such, the equalization filter may have been adapted at the corresponding optical receiver based on the first optical signal received from the optical transmitter.

Furthermore, the optical transmitter comprises a pulse shaping filter unit adapted to filter a second sequence of data symbols using a pulse shaping filter, thereby yielding a filtered sequence of data symbols. A frequency response of the pulse shaping filter may depend on the information regarding the equalization filter. In other words, the pulse shaping filter may be adjusted in accordance to the information regarding the equalization filter received from the optical receiver.

In addition, the optical transmitter may comprise a digital-to-optical converter adapted to convert the filtered sequence of data symbols into a second optical signal to be transmitted to the optical receiver over the WDM transmission channel. The digital-to-optical converter may comprise one or more digital-to-analogue converters (DACs) and a modulation unit for modulating an optical carrier signal with the filtered sequence of symbols to yield the second optical signal.

As such, the optical transmitter may be configured to adapt its pulse shaping filter based on information received from the corresponding optical receiver and to thereby increase a signal-to-noise ratio (SNR) of the signals received at the optical receiver. This process may be performed during a ramp-up phase of the optical transmitter and the optical receiver (e.g. subsequent to a change of the bandwidth of the WDM transmission channel). By way of example, the optical transmitter may be adapted to use a default transmitter filter (as the pulse shaping filter) when filtering the first sequence of data symbols for the first optical signal. The optical receiver may then adapt the equalization filter based on the received first optical signal and provide the optical transmitter with information regarding the equalization filter. The optical transmitter may then adjust the pulse shaping filter based on the information regarding the equalization filter and generate the second optical signal (subsequent to the first optical signal) using the adjusted pulse shaping filter (and not the default transmitter filter). As a result, the optical transmitter and the optical receiver may be adapted to the (changed) bandwidth of the WDM transmission channel.

The pulse shaping filter may correspond to a pre-emphasis filter depending on the information regarding the equalization filter. As such, the pulse shaping filter unit may be adapted to filter the second sequence of data symbols using the pre-emphasis filter. Furthermore, the pulse shaping filter unit may be adapted to further filter the filtered sequence of data symbols using the default transmitter filter, wherein the default transmitter filter is typically adapted to the bandwidth of the WDM transmission channel. Alternatively, the pulse shaping filter may correspond to a combination of a pre-emphasis filter which depends on the information regarding the equalization filter, and of the default transmitter filter which is typically adapted to the bandwidth of the WDM transmission channel. In the latter case, the pulse shaping filter unit may be adapted to apply a single combined pulse shaping filter (instead of applying the pre-emphasis filter and the default transmitter filter sequentially).

The profiling unit may be adapted to determine the pre-emphasis filter such that a frequency response of the pre-emphasis filter approximates a filter response of the equalization filter. For this purpose, the profiling unit may make use of the information regarding the equalization filter. By way of example, the information regarding the equalization filter may comprise one or more of the following: one or more fitting parameters of a fitting curve approximating the frequency response of the equalization filter, one or more filter coefficients of the equalization filter and/or an index to a pre-determined list of filters identifying a filter selected at the corresponding receiver, wherein a frequency response of the selected filter approximates the frequency response of the equalization filter.

According to a further aspect, an optical receiver adapted to receive an optical signal on an optical wavelength division multiplexed (WDM) transmission channel from a corresponding transmitter is described. The optical receiver comprises an optical-to-digital converter adapted to convert the first optical signal received from the optical transmitter into a digital signal. The optical receiver may be a coherent optical receiver. As such, the optical-to-digital converter may comprise a coherent optical detection unit providing one or more pairs of analog electrical signals, wherein a pair of analog electrical signals comprises an in-phase and a quadrature-phase signal (also referred to as components). Furthermore, the optical-to-digital converter may comprise one or more analogue-to-digital converters (ADCs), converting the analogs signals to the digital signal. The digital signal is representative of the first sequence of data symbols which was used at the optical transmitter for modulating the first optical signal.

The optical receiver comprises an equalization unit adapted to filter the digital signal using an equalization filter, thereby yielding a filtered digital signal. Furthermore, the optical receiver comprises an adaptation unit configured to adapt the equalization filter in order to compensate for a transfer function of the WDM transmission channel and in order to compensate for a pulse shaping filter (e.g. the default transmitter filter) applied to the first sequence of data symbols at the corresponding transmitter. The adaptation unit may be configured to determine the equalization filter based on the digital signal (which is derived from the first optical signal). By way of example, the adaptation unit may make use of blind adaptation techniques such as the Constant Modulus Algorithm to determine the equalization filter. Alternatively or in addition, the adaptation unit may make use of training based adaptation techniques. By way of example, the first optical signal may comprise a sequence of training symbols known to the optical receiver, thereby enabling the optical receiver to better adapt the equalization filter to the transfer function of the WDM transmission channel and/or to the pulse shaping filter of the optical transmitter.

The optical receiver further comprises a feedback unit adapted to provide information regarding the equalization filter to the corresponding transmitter for the purpose of modification of the pulse shaping filter. The feedback unit may make use of a control plane or of another WDM transmission channel to transmit this information regarding the equalization filter to the optical transmitter.

Furthermore, the optical receiver may comprise a decision unit adapted to estimate the first sequence of data symbols based on the filtered digital signal.

The optical receiver and the optical transmitter may be adapted for the transmission of polarization division multiplexed (PDM) optical signals. As such, the first optical signal (and the second optical signal) may be polarization division multiplexed optical signal comprising a first and a second polarization, respectively, and the digital signal may comprise a first polarization component (or a digital signal for the first polarization) and a second polarization component (or a digital signal for the second polarization). In a similar manner, the filtered digital signal may comprise a first polarization component and a second polarization component. In case of a coherent optical receiver, each of the polarization components may comprise an in-phase component and a quadrature-phase component, respectively.

In case of PDM, the equalization unit may be a polarization de-multiplexing unit and the equalization filter may comprise a plurality of Finite Impulse Response, referred to as FIR, filters in a butterfly structure. The feedback unit may be adapted to determine the information regarding the equalization filter based on the plurality of FIR filters. In particular, the feedback unit may be adapted to determine a common mode component of the plurality of FIR filters for the first and second polarizations, respectively. The common mode component for the first (second) polarization may e.g. be determined based on the sum of the FIR filters of the equalization filter which contribute to the first (second) polarization of the filtered digital signal. In particular, the common mode component for the first (second) polarization may e.g. be determined based on the sum of the squared absolute responses derived from the FIR filters of the equalization filter which contribute to the first (second) polarization of the filtered digital signal. Hence, the information regarding the equalization filter may be determined based on the common mode component for the first and/or second polarizations.

As indicated above, the information regarding the equalization filter may comprise filter coefficients of a filter derived from the equalization filter. Alternatively or in addition, the feedback unit may be adapted to approximate a frequency response of the equalization filter, e.g. using a pre-determined fitting curve such as a polynomial of a certain order or a sinusoidal fitting curve, thereby approximating the frequency response using one or more fitting parameters. The fitting may be performed by reducing/minimizing e.g. a mean square error. The feedback unit may be adapted to determine the information regarding the equalization filter based on the approximated frequency response of the equalization filter. The information regarding the equalization filter may comprise the one or more fitting parameters. Alternatively or in addition, the feedback unit may be adapted to approximate the equalization filter by selecting a filter from a pre-determined list of filters. The frequency response of the selected filter may approximate the frequency response of the equalization filter (e.g. by reducing/minimizing a mean square error). In such cases, the information regarding the equalization filter may comprise an index to the pre-determined list of filters possibly stored in a look-up table (LUT) identifying the selected filter.

According to a further aspect, an optical transmission system adapted for wavelength division multiplexed (WDM) transmission is described. The optical transmission system comprises an optical transmitter according to any of the aspects outlined in the present document. Furthermore, the optical transmission system comprises an optical receiver according any of the aspects outlined in the present document. In addition, the optical transmission system may comprise a feedback path adapted to carry the information regarding the equalization filter from the optical receiver to the optical transmitter. The feedback path may comprise one or more of the following: a control plane of the optical transmission system or a WDM transmission channel from a far-end transponder comprising the optical receiver to a near-end transponder comprising the optical transmitter.

According to another aspect, a method for increasing a signal-to-noise ratio and the overall performance of an optical transmission system comprising an optical transmitter and a corresponding optical receiver is described. The method comprises receiving information regarding an equalization filter, wherein the equalization filter has been adapted at the optical receiver. The method proceeds in filtering a sequence of data symbols using a pulse shaping filter, thereby yielding a filtered sequence of data symbols. The frequency response of the pulse shaping filter depends on the information regarding the equalization filter. Furthermore, the method may comprise converting the filtered sequence of data symbols into an optical signal and/or transmitting the optical signal to the optical receiver.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings, wherein FIG. 1 illustrates example WDM channels on a fixed and on a flexible frequency grid;

As outlined in the introductory section, WDM channels of different widths may be used to adapt the capacity of an optical transmission system to impairments on the optical transmission paths. WDM channels 111, 112 with different channel widths (channel spacing) are illustrated in the WDM channel diagram 110 of FIG. 1. When adapting the width of a WDM channel 111, the transmitter filter used at the transmitter of the WDM channel 111 typically has to be adapted to the reduced or increase bandwidth of the WDM channel 111. Such a transmitter filter is mainly used for pulse shaping, in order to reduce the crosstalk between adjacent WDM channels 111, 112. As such, the transmitter filter may also be referred to as pulse shaping filter. The frequency response of the transmitter filter may be designed in order to optimize (i.e. in order to increase) the electrical signal-to-noise ratio (SNR) at the corresponding receiver. In order to adapt the transmitter filter to a modified width of the WDM channel 111, the transmitter filter may be provided with a variable attenuation profile, thereby enabling to adjust the cut-off frequency of the transmitter filter to the modified width of the WDM channel 111. In the present document, it is proposed to dynamically determine the filtering profile used at the transmitter side such that the received SNR at the receiver side is optimized (i.e. increased). Hence, it is proposed to determine a transmitter filter which optimizes the performance of the overall optical transmission channel. It is proposed to optimize the filtering profile at the transmitter side by analyzing the response of one or more of the (linear) adaptive equalizers used in the (coherent) receiver. The adaptive one or more equalizers at the receiver may make use of a constant modulus algorithm, CMA or other blind adaptation techniques. In other words, it is proposed to determine the transmitter filter at the transmitter based on information regarding the transfer function of the optical transmission channel which is available at the corresponding receiver. As such, it is possible to modify the width of a WDM channel 111 and to automatically adapt the transmitter filter at the transmitter to the modified WDM channel 111, wherein the automatically adapted transmitter filter optimizes (i.e. increases) the SNR at the receiver.

Figure 2A:
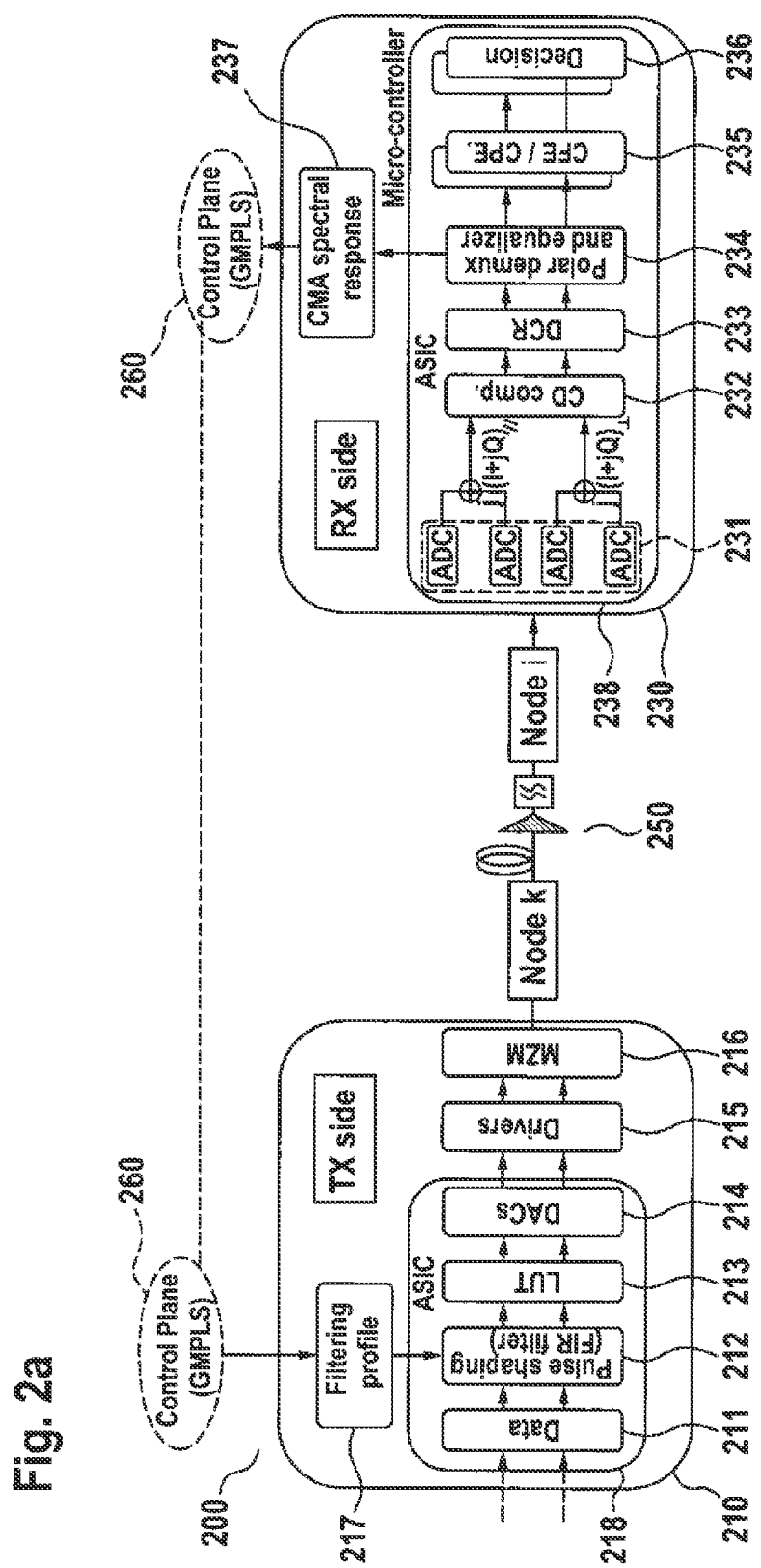
FIG. 2a shows a block diagram of an example optical transmission system.

FIG. 2a illustrates an example optical transmission system 200 comprising a transmitter 210, an optical transmission path 250 and a receiver 230. Furthermore, the optical transmission system 200 comprises a control plane 260 which may be used to manage the optical transmission system 200. The control plane 260 typically makes use of the network protocol suite GMPLS (Generalized Multi-Protocol Label Switching). By way of example, the control plane 260 may be used to instruct the transmitter 210 and the receiver 230 to change the width of the WDM channel 111 used on the optical transmission path 250.

The transmitter 210 comprises a first digital signal processor 218, which may e.g. be implemented as an ASIC (Application-specific integrated circuit). In the illustrated example a transmitter 210 for polarization multiplexed optical signals is depicted. The first digital signal processor 218 provides two sequences of symbols (e.g. QPSK symbols) 211 for the two polarizations of the optical signal, respectively. The two sequences of symbols 211 are filtered by a bank of two transmitter filters 212 for the two polarizations of the optical signal, respectively. In an embodiment, the two transmitter filters 212 are identical, however, in other embodiments, the two transmitter filters 212 are specific for the respective polarizations of the optical signal. In addition, the transmitter 210 may comprise an LUT (Look-up Table) 213 for providing a list of pulse shaping filters. A pair of Digital-to-Analogue-Converters (DAC) 214 is used to convert the filtered sequences of symbols 211 into a pair of electrical signals. The pair of electrical signals is used to modulate the two polarizations of the optical signal which is transmitted over the transmission path 250 (using drivers 215 and modulators 216, e.g. Mach-Zehnder-Modulators, MZM).

The optical receiver 230 illustrated in FIG. 2a is a coherent optical receiver which is configured to convert the received optical signal into a pair of complex digital signals, wherein each digital signal comprises an in-phase component and a quadrature-phase component. For this purpose, the coherence receiver may comprise a coherent detector and a bank of Analogue-to-Digital Converters (ADC) 231. Furthermore, the optical receiver 230 comprises a second digital signal processor 238 (e.g. an ASIC) which processes the pair of digital signals, in order to recover the two sequences of symbols 211 in the decision units 236. The processing of the pair of digital signals typically comprises CD compensation 232, Clock Recovery (DCR) 233 and carrier frequency/carrier phase estimation 235.

Figure 2B:
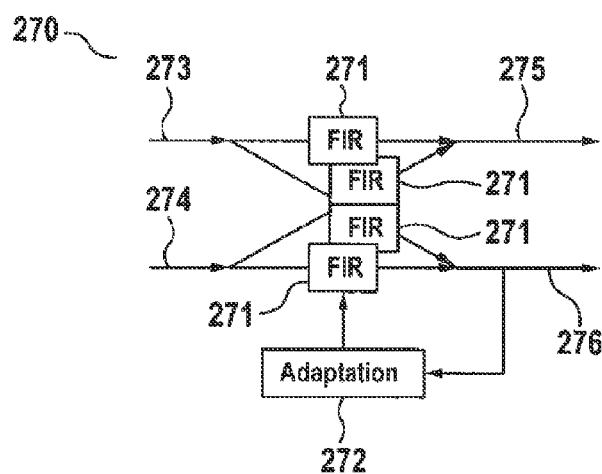
FIG. 2b shows the block diagram of an example filter bank used in a polarization demultiplexer unit.

Furthermore, the processing typically comprises a polarization demultiplexing and equalization unit 234. The polarization demultiplexing unit 234 may comprise one or more equalization filters which are used for channel equalization and/or for polarization de-multiplexing. The polarization demultiplexing unit 234 typically comprises a bank 270 of four FIR (Finite Impulse Response) filters 271 arranged in a butterfly structure (see FIG. 2b). The filter taps of the FIR filters 271 may be determined and adapted continuously within a feedback loop comprising an adaptation unit 272. The adaptation unit 272 may execute a CMA algorithm which continuously adapts the filter taps in a "blind" manner. In other words, the CMA algorithm determines the filter taps of the FIR filters 271 solely based on the samples of the pair of digital signals derived from the received optical signal. The filter taps are typically determined such that the filtered signal downstream of the polarization de-multiplexing unit 234 (i.e. subsequent to filtering with the FIR filter bank 270) exhibits pre-determined signal characteristics. By way of example, for signals of unit amplitude, the CMA may try to minimize the magnitude of the error term $E=(|s_{out}|-1)^2$ at the output of the polarization de-multiplexing unit 234, wherein $|s_{out}|$ is the intensity (or amplitude) of an output signal $s_{out}$ of the polarization de-multiplexing unit 234.

The CMA algorithm was introduced by Godard (IEEE Tr. Comm, vol. 28, no. 11. pp. 1867-1875, 1980) and the description thereof is incorporated by reference. Furthermore, the CMA is discussed in the document "Digital Equalization of 40 Gbit/s per Wavelength Transmission over 2480 km of Standard Fiber without Optical Dispersion Compensation", S. J. Savory et al., Proceedings of ECOC 2006, Cannes, France, paper Th2.5.5, Sep. 2006. The description of the CMA in this document is hereby incorporated by reference.

The FIR filters 271 of the polarization demultiplexing unit 234 may be denoted as $$H_{ij}(z) = \sum_{n=0}^{N-1} c_{ij,n} z^{-n},$$

with i, j=1,2 being indexes identifying each of the four FIR filters 271 and with $c_{ij,n}$, n=0, . . . N-1 being the N filter taps of the respective FIR filters 271, N being in the range of 10. The FIR filters 271 may typically be divided into two filter components, a so called common mode component and a so called differential mode component. The differential mode component is primarily responsible for turning the polarization plane of the received signal, in order to correctly identify the polarization planes of the two orthogonally polarized signal components. The common mode component is primarily responsible for removing undesirable cross-talk distortions within the received signal, which may be due to interferences of the particular WDM channel with neighboring WDM channels. As such, the common mode component is typically directed at isolating the signal portions of the particular WDM channel from signal portions originating from neighboring WDM channels.

Let $H_{11}(z)$ and $H_{21}(z)$ be the FIR filters 271 which mix the pair of digital signals 273, 274 at the input of the polarization demultiplexing unit 234 to yield the first polarization demultiplexed digital signal 275 (at the output of the polarization demultiplexing unit 234). The common mode component of these two FIR filters may be determined as the square root of the sum of the squared absolute responses derived from the two FIR filters $H_{11}(z)$ and $H_{21}(z)$. The resulting filter may be referred to as the common mode FIR filter component for the first polarization or as the first common mode filter. In a similar manner, the common mode FIR filter components for the second polarization (or the second common mode filter) may be determined from the filters $H_{12}(z)$ and $H_{22}(z)$ which mix the pair of digital signals 273, 274 at the input of the polarization demultiplexing unit 234 to yield the second polarization demultiplexed digital signal 276 (at the output of the polarization demultiplexing unit 234). The common mode components may be determined e.g. in the feedback unit 237.

As such, coherent receivers 230 typically use linear adaptive equalizers (which e.g. make use of CMA, decision directed LMS (Least Mean Square), . . . ) to demultiplex the received polarization tributaries after transmission. These linear equalizers typically try to mitigate for inter-symbol interference induced penalties by enhancing highest frequencies of the spectrum. At low optical SNR, this may cause an enhancement of the noise contained in the signal bandwidth and thereby degrade the performance. In order to avoid this issue, it is proposed to use the spectral profile of the linear equalizer response at the receiver 230 to adapt the filtering profile used by the transmitter filter 212 at the transmitter 210 and thereby maximize (i.e. increase) the energy of the transmitted signal with respect to the received bandwidth. For this purpose, the spectral response of the CMA may be analyzed in a low speed micro-controller in the feedback unit 237. In other words, the CMA algorithm typically operates at a lower update rate than the symbol rate (e.g. a factor 10 or 100 lower than the symbol rate). Consequently, the determination of the spectral response of the CMA, i.e. the determination of the FIR filters 271 may be performed at lower processor rates than the processing of the received digital signals.

Figure 3:
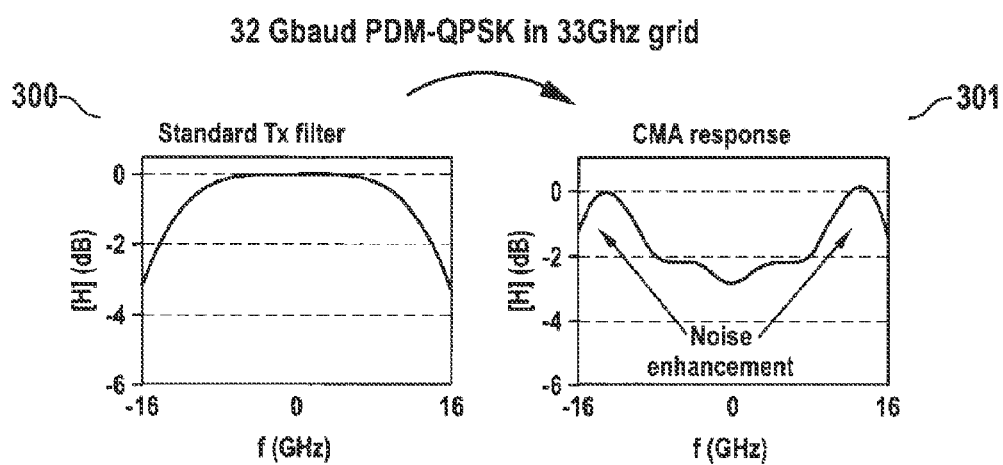
FIG. 3 illustrates the frequency response of example optical filters at the transmitter and the receiver of an optical transmission system.

An example of the impact of the tight filtering at the transmitter 210 onto the spectral response of the CMA filter (i.e. on the FIR filters 271) is shown in FIG. 3. After filtering experimentally a 32-Gbaud PDM-QPSK signal with a 33-GHz bandwidth interleaver (i.e. with a transmitter filter 212 having a frequency response 300 illustrated in FIG. 3), the spectral response 301 of the FIR filters 271 at the receiver 230 shows a clear enhancement of high frequencies. This enhancement of high frequencies can lead to a noise enhancement at low OSNR, thereby reducing the performance of the optical transmission system 200.

In order to reduce the effect of noise enhancement at the receiver 230, it is proposed to provide the spectral response 301 of the FIR filters 271 to the transmitter 210, and to thereby enable the transmitter 210 to design an appropriate transmitter filter 212 which reduces the undesirable enhancement of noise at the receiver 230. This can be done by making use of the control plane 260. In particular, the receiver 230 may pass information regarding the frequency response 301 of the FIR filters 271 to the control plane 260 and the control plane 260 may forward this information to the transmitter 210. Alternatively or in addition, a direct upstream communication process may be used as will be outlined at a later section of this document. Such a direct upstream communication process may be faster than a communication via the control plane 260, thereby increasing dynamics.

It should be noted that in order to reduce the amount of information that is transmitted from the receiver 230 to the transmitter 210, the spectral response 301 of the FIR filters 271 may be approximated. For this purpose, the FIR filter response may be fitted, e.g. by a polynomial of a pre-determined degree or by a sinusoidal function. As a result, only the reduced number of fitting parameters is transmitted from the receiver 230 to the transmitter 210. Alternatively or in addition, the receiver 230 and the transmitter 210 may make use of a common list of default spectral responses (also referred to as a bank of filtering functions). The receiver 230 (in particular the feedback unit 237) may be configured to select a default spectral response from the list which best approximates the actual spectral response 301 of the FIR filters 271. In this case, only the index from the list may be transmitted to the transmitter 230. The transmitter 210 is then configured (e.g. using the profiling unit 217) to recover the default spectral response from the common list using the transmitted index.

The information regarding the spectral response 301 of the FIR filters 271 (e.g. the FIR filter coefficients, the fitting parameters and/or an index to a common list of default filters) may be used by the transmitter 210 to modify the pulse shaping performed in the transmitter filter 212, and to thereby optimize (i.e. increase) the signal-to-noise ratio after polarization demultiplexing 234, and hence to optimize (i.e. increase) the performance of the optical transmission system 200.

As outlined above, the FIR filters 271 of the polarization demultiplexing unit 234 typically comprise a common mode component. In particular, a specific common mode component may be determined for the first and second polarizations, respectively. The common mode component for the first polarization may be referred to as the first common mode component and the common mode component for the second polarization may be referred to as the second common mode component. The first common mode component may be derived from $H_{11}$ (z) and $H_{21}$ (z), and the second common mode component may be derived from $H_{12}$ (z) and $H_{22}$ (z). The frequency response 301 shown in FIG. 3 corresponds to the frequency response of the first or second common mode component. As such, the receiver 230 (e.g. the feedback unit 237) may be configured to provide information regarding the first and/or the second common mode component to the transmitter 210 (e.g. to the profiling unit 217 of the transmitter 210).

Figure 4:
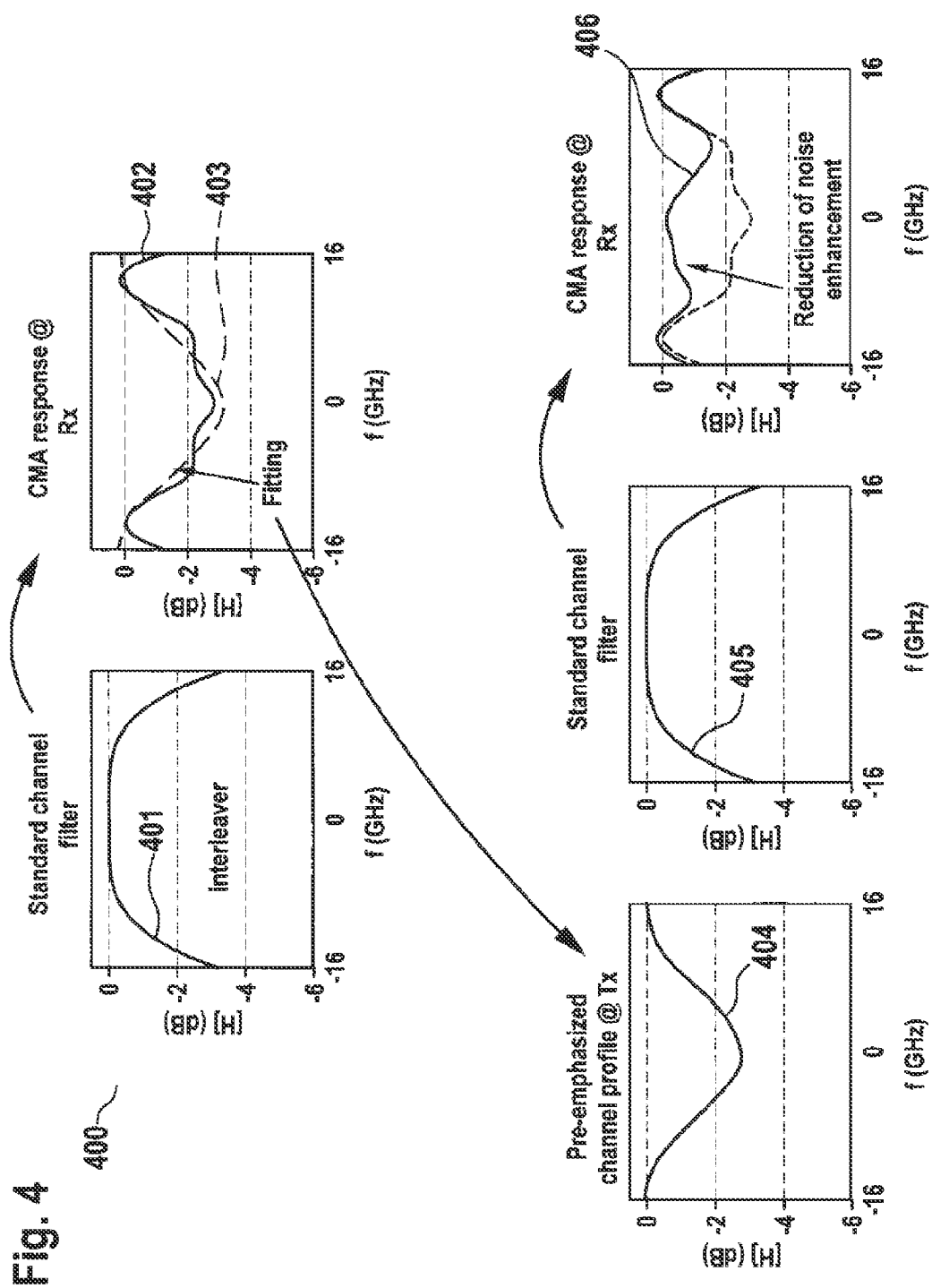
FIG. 4 illustrates an example method for adapting the optical filter at the transmitter based on one or more filters determined at the receiver of an optical transmission system.

FIG. 4 shows an example scheme 400 for adapting the transmitter filter 212 based on the FIR filters 271 using 32-Gbaud PDM-QPSK experimental data. The PDM-QPSK data 211 is filtered using a standard 33 GHz channel filter having a frequency response 401. At the receiver 230, the polarization demultiplexing unit 234 (e.g. using the CMA algorithm) yields a bank 270 of FIR filters 271. The spectral response 402 of the first or second common mode of the FIR filters 271 is shown in FIG. 4. The spectral responses 402 of the first and second common mode components of the FIR filters 271 may be fitted to yield fitted spectral responses 403, which are fed back to the transmitter 210, thereby reducing the amount of data to be transmitted from the receiver 230 to the transmitter 210.

The profiling unit 217 of the transmitter 210 may use the information received from the receiver 230 to adapt the spectral response of the transmitter filter 212, thereby increasing the SNR of the transmission channel. Alternatively, a pre-emphasis filter 404 may be applied to the sequences of symbols 211 prior to filtering using the standard transmitter filter 405 (which corresponds to the filter 401). That is, equivalently to modifying the pulse shape of the transmitter filter 212 in the time domain, the channel response may be modified at the transmitter side using the filtering profile received from the receiver 230.

After this modification of the filtering performed at the transmitter 210, the spectral response 406 of the FIR filters 271 at the receiver 230 becomes more flat, thus reducing noise enhancement at low OSNR and improving the performance of the optical transmission system 200. Experiments have shown e.g. a 0.5 dB OSNR improvement due to filter optimization. This improvement should be even larger for tighter filtering, i.e. for filtering at less than 33 GHz, e.g. 25 GHz.

In the following, a possible implementation of a direct feedback link between the receiver 230 and the transmitter 210 is described, in order to provide the feedback information regarding the FIR filters 271 to the transmitter 210. For this purpose, the receiver 230 and the transmitter 210 make use of an upstream or reverse communication path between a (far-end) transponder comprising the receiver 230 and a (near-end) transponder comprising the transmitter 210. The far-end transponder and the near-end transponder may make use of the communication protocols used for exchanging data (i.e. payload data) on the WDM channels 211, 212 of the optical communication system 200. In particular, the far-end transponder 230 and the near-end transponder 210 may make use of the Optical Transport Network (OTN) protocol framework specified in ITU-T standard G.709. The OTN framework defines how to route payload data across an optical communication system 200. The payload data is embedded into so called frames, wherein each frame comprises a frame overhead. The frame overhead comprises a plurality of fields (bytes), wherein the plurality of fields may be used to implement specific communication and control channels between the network elements (e.g. the far-end transponder comprising the receiver 230 and the near-end transponder comprising the transmitter 210) of the optical communication system 200. The overhead of the OTN frames (typically referred to as Optical Transport Unit (OTUk) frames) are directly accessible by the near-end transponder and the far-end transponder.

Consequently, the far-end transponder (comprising the receiver 230) may insert the information regarding the filter response of the FIR filters 271 into a pre-determined byte of the overhead of an OTUk frame which is sent via an optical communication channel from the far-end transponder to the near-end transponder (comprising the transmitter 210), thereby informing the near-end transponder on how to adapt the profile of the transmitter filter 212. As such, the feedback communication link can be implemented as an in-band communication link between the far-end transponder (comprising the receiver 230) and the near-end transponder (comprising the transmitter 210).

In the present document, a scheme for determining transmitter filters for a tightly spaced WDM transmission system has been described. The scheme allows the determination of the transmitter filter for a particular WDM transmission channel based on the frequency response of equalizer filters at the receiver of the WDM transmission channel. As a result, the performance of the WDM transmission channel can be improved. In particular, the proposed scheme enables the optimization of the signal-to-noise ratio in coherent receivers in the context of ultra dense WDM systems. Moreover, the proposed scheme enables the flexible optimization of the performance of tightly filtered signals in ultra dense WDM systems, which translates into longer maximum transmission distances.

The proposed scheme may be performed during the ramp up phase of a WDM transmission channel (e.g. subsequent to a modification of the width of the WDM channel or subsequent to an initial set up of the WDM channel). Furthermore, the proposed scheme may be performed regularly, in order to adapt the pulse shaping at the transmitter to changing channel conditions. As indicated above, the adaptation of the transmitter filter may be performed for each polarization of the PDM signal separately. Alternatively, a common transmitter filter may be used for both polarizations. In the latter case, information regarding a common mode of all of the FIR filters may be fed back from the receiver to the transmitter. The common mode of all of the FIR filters may be derived as the sum of and/or as the average of all of the FIR filters.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An optical transmitter adapted to transmit an optical signal on an optical wavelength division multiplexed (WDM) adjustable bandwidth transmission channel of a WDM grid, the WDM grid comprising transmission channels adjustable to at least two different bandwidths, to a corresponding optical receiver, the optical transmitter comprising:
a profiling unit adapted to receive information regarding a spectral response of an equalization filter for a given bandwidth of the WDM transmission channel, the equalization filter adapted at the corresponding optical receiver, based on a first optical signal received from the optical transmitter;
a pulse shaping filter unit adapted to filter a second sequence of data symbols using a pulse shaping filter, thereby yielding a filtered sequence of data symbols, wherein the optical transmitter is configured to adapt a frequency response of the pulse shaping filter based on the information regarding the spectral response of the equalization filter for the given bandwidth of the WDM transmission channel to adapt the optical transmitter to the given bandwidth of the WDM transmission channel; and
a digital-to-optical converter adapted to convert the filtered sequence of data symbols into a second optical signal to be transmitted to the optical receiver;
wherein the information regarding the spectral response of the equalization filter comprises one or more of
one or more fitting parameters of a fitting curve that approximates a frequency response of the equalization filter;
one or more filter coefficients of the equalization filter; and
an index to a pre-determined list of filters that identifies a filter selected at the corresponding receiver; wherein a frequency response of the selected filter approximates the frequency response of the equalization filter.

2. The optical transmitter of claim 1, wherein the pulse shaping filter is a pre-emphasis filter that depends on the information regarding the equalization filter; and
the pulse shaping filter unit is adapted to further filter the filtered sequence of data symbols using a default transmitter filter adapted to a bandwidth of the WDM transmission channel.

3. The optical transmitter of claim 2, wherein the profiling unit is adapted to determine the pre-emphasis filter that has a frequency response which approximates a filter response of the equalization filter, based on the information regarding the equalization filter.

4. The optical transmitter of claim 1, wherein the pulse shaping filter corresponds to a combination of a pre-emphasis filter that depends on the information regarding the equalization filter and a default transmitter filter adapted to a bandwidth of the WDM transmission channel.

5. An optical transmission system adapted for wavelength division multiplexed (WDM) transmission, the optical transmission system comprising:

an optical transmitter according to claim 1;
an optical receiver; and
a feedback path adapted to carry information regarding the spectral response of the equalization filter from the optical receiver to the optical transmitter.

6. The optical transmission system according to claim 5, wherein the feedback path comprises one or more of
a control plane of the optical transmission system; and
a WDM transmission channel from a far-end transponder that comprises the optical receiver to a near-end transponder that comprises the optical transmitter.

7. An optical receiver adapted to receive an optical signal on an optical wavelength division multiplexed (WDM) adjustable bandwidth transmission channel of a WDM grid, the WDM grid comprising transmission channels adjustable to at least two different bandwidths, from a corresponding transmitter, the optical receiver comprising:
an optical-to-digital converter adapted to convert a first optical signal received from the optical transmitter into a digital signal; wherein the digital signal is representative of a first sequence of data symbols;
an equalization unit adapted to filter the digital signal using an equalization filter; thereby yielding a filtered digital signal;
an adaptation unit configured to adapt the equalization filter based on the digital signal to compensate for a transfer function of the WDM transmission channel, to compensate for a pulse shaping filter applied to the first sequence of data symbols at the corresponding transmitter and to adapt the optical receiver to a given bandwidth of the transmission channel; and
a feedback unit adapted to provide information regarding a spectral response of the equalization filter to the corresponding transmitter for modification of the frequency response of the pulse shaping filter to adapt the optical transmitter to the given bandwidth of the WDM transmission channel;
wherein
the first optical signal is a polarization multiplexed optical signal comprising a first and a second polarization;
the digital signal comprises a first polarization component and a second polarization component, each comprising an in-phase component and a quadrature-phase component, respectively;
the equalization unit is a polarization de-multiplexing unit;
the filtered digital signal comprises a first polarization component and a second polarization component;
the equalization filter comprises a plurality of Finite Impulse Response (FIR) filters in a butterfly structure; and
the feedback unit is adapted to determine the information regarding the equalization filter based on the plurality of FIR filters.

8. The optical receiver of claim 7, wherein the feedback unit is adapted to
determine a common mode component of the plurality of FIR filters for the first and second polarizations, respectively; and
determine the information regarding the equalization filter based on the common mode component for the first and second polarizations.

9. The optical receiver of claim 7, wherein the information regarding the equalization filter comprises filter coefficients of a filter derived from the equalization filter.

10. The optical receiver of claim 7, wherein the feedback unit is adapted to
approximate a frequency response of the equalization filter; and
determine the information regarding the equalization filter based on the approximated frequency response of the equalization filter.

11. The optical receiver of claim 10, wherein
approximating the equalization filter comprises fitting the frequency response of the equalization filter using one or more fitting parameters; and
the information regarding the equalization filter comprises the one or more fitting parameters.

12. The optical receiver of claim 10, wherein
approximating the equalization filter comprises selecting a filter from a pre-determined list of filters;
a frequency response of the selected filter approximates the frequency response of the equalization filter; and
the information regarding the equalization filter comprises an index to the pre-determined list of filters that identify the selected filter.

13. A method for increasing a signal-to-noise ratio of an optical transmission system comprising an optical transmitter and a corresponding optical receiver, the optical transmitter being adapted to transmit an optical signal on an optical wavelength division multiplexed (WDM) adjustable bandwidth transmission channel of a WDM grid, the WDM grid comprising transmission channels adjustable to at least two different bandwidths, to the optical receiver, the method comprising:
receiving information regarding the spectral response of an equalization filter for a given bandwidth of the WDM transmission channel, the equalization filter being adapted at the optical receiver;
filtering a sequence of data symbols using a pulse shaping filter at the optical transmitter, thereby yielding a filtered sequence of data symbols; wherein a frequency response of the pulse shaping filter is adapted based on the information regarding the spectral response of the equalization filter for the given bandwidth of the WDM transmission channel to adapt the optical transmitter to the given bandwidth of the WDM transmission channel;
converting the filtered sequence of data symbols into an optical signal; and
transmitting the optical signal to the optical receiver;
wherein the information regarding the spectral response of the equalization filter comprises one or more of
one or more fitting parameters of a fitting curve that approximates a frequency response of the equalization filter;
one or more filter coefficients of the equalization filter; and
an index to a pre-determined list of filters that identifies a filter selected at the corresponding receiver; wherein a frequency response of the selected filter approximates the frequency response of the equalization filter.

* * * * *